Jan. 8, 1924. Re. 15,743

H. S. MOIR

SAVINGS BANK INTEREST INDICATOR

Original Filed May 25, 1920 3 Sheets-Sheet 1

INVENTOR.
Harry S. Moir
BY Percy S. Webster
ATTORNEY

Jan. 8, 1924.

H. S. MOIR

Re. 15,743

SAVINGS BANK INTEREST INDICATOR

Original Filed May 25, 1920 3 Sheets-Sheet 2

INVENTOR.
Harry S. Moir
BY Percy J. Webster
ATTORNEY

Jan. 8, 1924. Re. 15,743

H. S. MOIR

SAVINGS BANK INTEREST INDICATOR

Original Filed May 25, 1920 3 Sheets-Sheet 3

INVENTOR
Harry S. Moir
BY Percy S. Webster
ATTORNEY

Reissued Jan. 8, 1924.

Re. 15,743

UNITED STATES PATENT OFFICE.

HARRY S. MOIR, OF CHICO, CALIFORNIA.

SAVINGS-BANK INTEREST INDICATOR.

Original No. 1,383,227, dated June 28, 1921, Serial No. 384,037, filed May 25, 1920. Application for reissue filed June 18, 1923. Serial No. 646,264.

*To all whom it may concern:*

Be it known that I, HARRY S. MOIR, a citizen of the United States, residing at Chico, in the county of Butte and State of California, have invented certain new and useful Improvements in Savings-Bank Interest Indicators, of which the following is a specification.

This invention relates to systems and apparatus for indicating interest on savings accounts, and pertains especially to a system and device for finding, displaying and indicating interest on savings accounts of various amounts, at various rates of interest.

The object of the invention is to provide a simple and ingenious system or method for ascertaining the interest on amounts of various denominations.

A further object of the invention is to provide a novel and peculiar device adapted to be given expeditious operation for working the system.

A still further object of the invention is to provide, in one sheet or board and on the same face thereof, a pair of columns of numerals representing various amounts of bank deposits in savings accounts, and a plurality of columns representing various amounts of interest, all of said columns being vertically parallel, and the numerals constituting all the columns being in horizontal alinement, that is to say, the numerals of the deposit columns have interest numerals opposite thereto in adjacent columns, and the deposit and interest numerals are differentiated either by color or by the difference in character or design of the numerals.

An object still further of the invention is to provide an interest finder and indicator which are in one device contained within a frame holding the sheet of numeral columns and slidable vertically over the columns, and having a plurality of gates or shutters slidable across the columns.

Various other objects, advantages and improved results are attainable in the manufacture and practical application of the invention, now to be fully described.

In the accompanying drawings forming part of this application:—

The same reference letters denote the same parts throughout the several views of the drawings.

Figure 1:
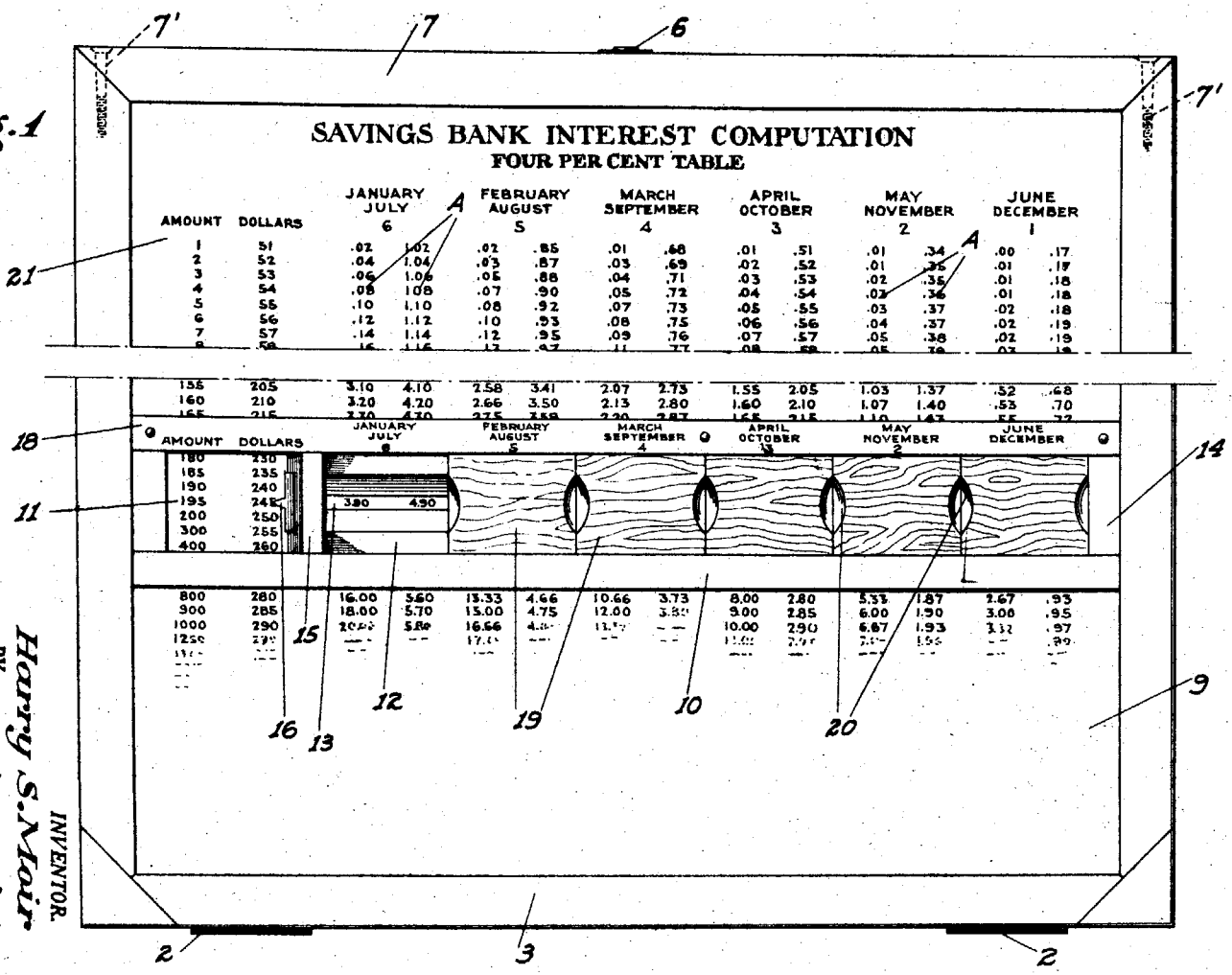
Fig. 1 is a front plan view partly broken away illustrating the application of the invention.
Figure 2:
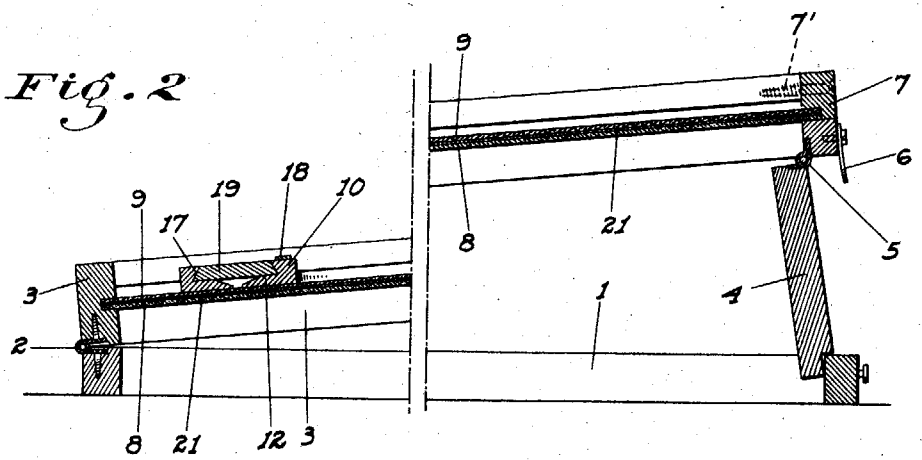
Fig. 2 is a longitudinal sectional view partly broken away showing the device in open or raised position.
Figure 3:
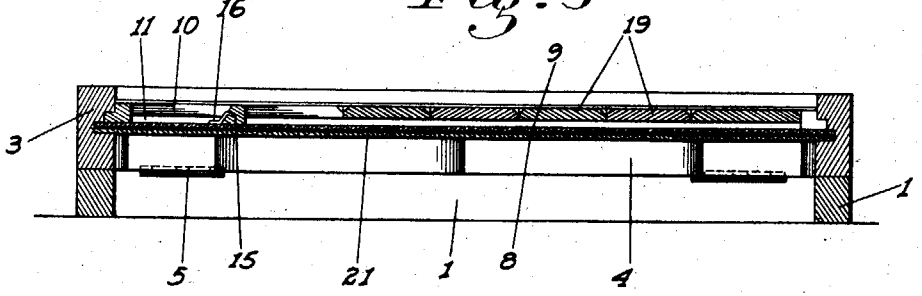
Fig. 3 is a cross section taken through the gates.
Figure 4:
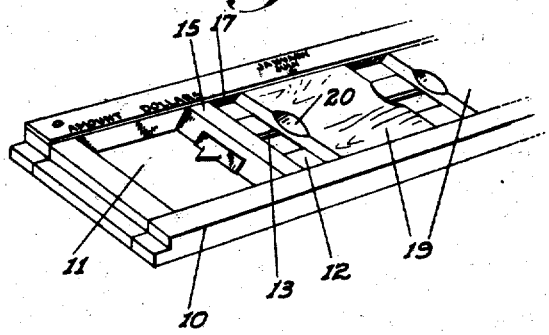
Fig. 4 is a detail perspective view of part of the sliding gate holder and part of the gates.

In carrying out my invention, I employ a base frame 1, hinged as at 2, to a main frame 3 which has a leg member 4 hinged thereto, as at 5, and the free end of said member engages the base frame 1 for holding the main frame in raised or inclined position. Said leg member being folded within the main frame and said frames being hooked together as at 6. In this position the device may be used flat upon a desk or table, or it may be stood upon its hinged end and suitably supported in standing position for operation. The free end of the main frame 3 has removable sections 7 secured by suitable screws 7′, for inserting into the frame 3 a pair of plates 8 and 9, with a printed numeral sheet therebetween. The bottom plate 8 may be composed of metal or other suitable material, but the top or face plate 9 must be transparent, preferably glass. The removable section 7 also affords means for inserting the gate holder, hereinafter particularly referred to, into the frame 3.

The holder 10, which is adapted to be moved vertically between guides 10ª of the main frame 3, has an opening 11 therethrough adjacent to one end thereof, a bottom member 12 being offset from the front face of the holder, and said member 12 being provided with a longitudinal slot 13 central of the holder. The slot is closed at one end by the end 14 of the holder which forms an abutment for slidable gates, hereinafter to be fully described, and the slot is closed at the other end by a stop rib 15.

This rib is provided with a pointer 16 projecting into the holder opening 11. The walls of the slot 13 are beveled, and the holder has undercuts or longitudinal grooves 17, for purposes as will be hereinafter disclosed. The holder has the indicia "Amount, dollars" opposite the opening 11, and the names of the months of a year are represented in pairs as—

| | | |
|---|---|---|
| January<br>July<br>6 | February<br>August<br>5 | March<br>September<br>4 |
| April<br>October<br>3 | May<br>November<br>2 | June<br>December<br>1 |

along the upper edge of the holder, and under the respective pairs of month names the numerals 6, 5, 4, 3, 2, 1 appear. The said indica and numerals may be impressed or a metal plate 18 applied to a wooden holder, or otherwise made to appear on the outer face of the holder adjacent to the slot 13. The slidable gates 19 have edges which fit the undercut grooves 17 so that the outer face of the gates is flush with the outer face of the holder, and the end of the gates have finger notches 20 for expeditiously sliding the gates.

The left margin of the printed sheet 21, shows two adjacent columns of numerals under headings "Amounts" and "Dollars" corresponding with "Amounts and Dollars" on the margin holder opening 11. The "Amount" numerals and the "Dollar" numerals are printed or displayed either in different colors, that is to say one column may be printed in red and the other column in black, or they may be differentiated by distinctive fonts of type, that is one column may consists of bold-faced type and the other column may be composed of italics. The "Amounts" column comprises amounts from 1 to 10,000 and said "Dollar" column represents dollars from 51 to 400, which have been found sufficient for the usual savings bank business, but said columns may comprise a greater or less number of figures or numerals, and said columns are utilized in connection with interest table of three, three and one-half, and four per cent, the table shown in part in the accompanying drawings being a four per cent table, wherein the heads of the plural columns A show the months of a year arranged in pairs with the numerals 6, 5, 4, 3, 2, 1, in duplication of the same appearing on the slidable holder. These table columns are differentiated alternately by printing the numbers of one column distinctive in color or character from that of the adjacent column, corresponding to those of the "Amount" and "Dollars" columns hereinbefore mentioned, so as to show that a certain co-relation exists between the rows of figures in the various columns A and the "Amount" and "Dollar" columns. That is to say, if the "Amount" column is printed in black, the alternating and corresponding table months columns are printed in black also, while, if the "Dollar" for example, is printed in red, the other table months columns are printed in red. Or all columns may be printed alternatively in heavy black type and light faced type, as shown in the drawings. Therefore the gates are so proportioned relative to the total length of the slide, and the table-months columns A are so disposed on the sheet thereunder, that any portion of the slot 13 exposed by shifting the gates, will be above both sets of numerals in any one of the columns A. Obviously the particular table sheets are prepared, and supplied according to the interest paid by various savings banks.

Figure 5:
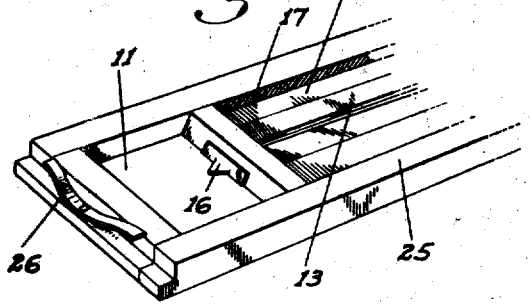
Fig. 5 is a detail perspective view of one end of a gate holder showing a modification.

Referring to Fig. 5 on the drawings, the ends of the gate frame or holder 25 have a plate spring 26 to cushion the holder in sliding movement and to hold the same against accidental sliding.

Figure 6:
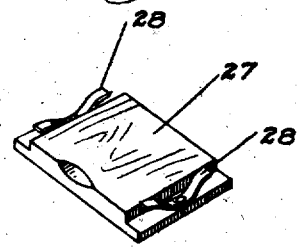
Fig. 6 is a similar view of a gate showing a modification.
Figure 7:
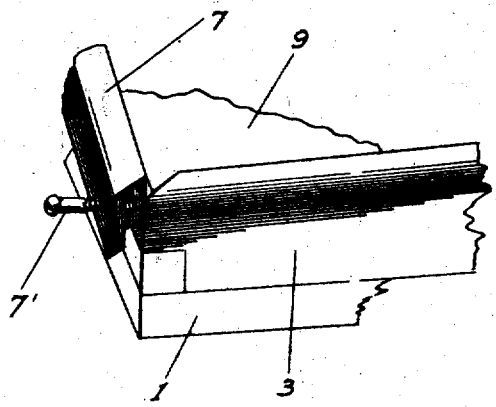
Fig. 7 is a detail perspective view of one corner of the main frame showing the removable section.

In Fig. 6 of the drawings, the gate 27 has plate spring 28 to facilitate the operation of the gates.

Other modifications and variations may be made in constructing and assembling the device in keeping with this invention for expeditious operation, and the size, shape and materials, as well as the interest tables, may be varied as desired or as occasion may demand, without departing from the spirit of the invention, as expressed in the appended claims.

It will be understood that the function of this invention is to locate quickly the amount of interest on an integral sum of money for an integral period of time without mind calculation and eye-strain, so that interest may be expeditiously found and indicated on various items of deposit and withdrawals in savings bank work, for example, if a savings account at the beginning of the year is $10,000, the credit interest in anticipation of said amount being left in the bank for six months at 4 per cent amounts to $200. Then, for example, the first or next deposit in said account is $245.00, and the interest is found by moving the gate holder so that the pointer will point to $245.00, as shown in the accompanying drawings, then sliding the gates so as to open the holder slot on the January column which exposes to view the interest $4.90 on said deposit, whereupon this interest amount may be printed or inscribed on a bank ledger page. Thus it will be seen that in posting, it is only necessary to slide the gates from one of the months columns to another according to the date of deposits and adjust the indicator according to the amount. A deposit made on or before the tenth of a month, as with many banking institutions, will draw interest for the full month, but if deposit is made after the tenth of the month it does not draw interest until the following month, at the same time the accountant is handling withdrawal chargeable for the whole month, the indicator slot is kept open, for example, on the six months column to show the interest on the withdrawal, and the slot is kept open on the five months columns to show the credit interest on the deposit.

In handling savings deposits and withdrawals in connection with the well known and commonly used posting machines of the Burroughs type, my system and apparatus is highly essential, in that, the operator of my device and of such machine, for example, working in the and for the month of January, knows that the slot is open during this month up to and including a certain day thereof, and after such day the sliding gates are moved to disclose the February columns. For these reasons the use of the names of the months as headings for the plural columns is important, as the operator or accountant disregards any special attention or thought of whether he is working on six, five or three months, but has fixed in his mind the name of the particular month he is working on. It will be understood that if the amount is indicated by the pointer in the black column of the pair of columns the interest is found in one or the other of the black plural columns, and if the pointer is set for a light numeral its interest is found in a light column.

Obviously the indicator is slid so as to set the pointer at any desired numeral of the pair of columns, and then the sliding gates are moved so to expose the interest on the amount indicated by the pointer.

While my system and device is primarily intended for even amounts arranged for six months time, the system and device is capable of use in connection with odd or uneven amounts and for figuring interest on deposits for longer terms, and transferring to an adding machine the readings produced by operating my device in connection with the same tables as shown in the drawings, for example to find the interest on the sum of $5,276, first set the pointer at and find the interest on 5,000 by moving the slides, then set to 200, and then set to 76, the slide or gate remaining open for the same column while the indicator is moved successively to the said amounts. The interest amounts for these factors having been set up on the adding machine a total is then taken. This can be taken on the machine as a sub-total, and the principal—$5,276—then set up upon the machine and added to the sub-total, giving as a total the sum of the principal and interest to date.

If the amount carries cents, read the cents in the principal column as if dollars. Take off the interest, and then set the decimal point back two places; thus, for 92¢ for six months, the reading will be 1.84 and setting the decimal point back, the true amount becomes .0184.

For amounts beyond those provided for in the table, do the reverse; for example, for $90,200 for 6 months, take the reading for 9000 for 6 months, which is 180, move the decimal one place, giving 1,800; then take off and add the reading for $200 for 6 months, which is 4,—making a total of $1,804.

If the period is a multiple of 6 months, for example, 1 year, 18 months, or 2 years and 6 months, compute the interest from the table for 6 months, and then multiply the total by 2, 3, 5 or other factor as the case requires. If the interest period is more than 6 months but less than a year, set up on the adding machine the interest items for 6 months, and then for the over-plus, which, for example, if the period is 11 months will be 5, i. e.—take the readings from the 6 months column and the 5 months column and add all of the items.

If the period is more than a year, say 2 years and 3 months, compute the interest for 2 years, as above, i. e., using the 6 months column and multiplying the total by 4. Then take the readings for the 3 months column and add to the foregoing.

If the rate of interest is other than 4 per cent, and the period more than 6 months, the approved practice will be to take off the interest from the table for the full period, as above, at 4 per cent, and then make the adjustment of the total according to the rate, adding $\frac{1}{4}$ if the rate is 5 per cent, and subtracting $\frac{1}{8}$ if the rate is $3\frac{1}{2}$ per cent. If the interest period involves a fraction of a month, this can in like manner be computed by taking the readings for 1 month, and then dividing by the fraction that the overplus is of one month.

These examples are given as illustrations of the possibilities of my invention should occasion arise, and I reserve the right to so operate my invention in these respects should it be desired.

The system of figuring savings interest in a savings bank is to credit the deposit for the full time it has to run to dividend period, the interest being based on anticipation that the deposit will remain undisturbed. If the deposit is subsequently withdrawn, a part of the amount interest is charged back for the time, which offsets the credit interest. All this is carried out by operating my device, which presents a safeguard against an operator operating in a wrong column, either by vertical movement of the indicator or by horizontal movement of the slides.

Claims:

1. A savings account interest sheet comprising a pair of parallel amount dollars columns of numerals, the numerals of one column being differentiated from the numerals of the other column and the numerals of said columns being in horizontal line, a plurality of parallel differentiated numeral columns parallel with said pair of columns, the numerals of the plural columns being in horizontal plane with each other and with the numerals of the pair of columns, the plural columns alternating with each other in differentiating numerals, said plural columns having the names of the months of a year assembled at the head thereof, and a vertically movable slotted holder including a plurality of transversely movable gates, one gate adapted to serve as an indicator within the slot of said holder, said gates being adapted to be moved from one of the months columns to another according to the date of deposits and to provide for adjusting the indicator according to the amount.

2. A savings-account interest sheet comprising a pair of differentiated columns forming an indicator lead, a plurality of differentiated columns representing the months of a year, and a vertically movable slotted holder including a plurality of transversely movable gates, one gate adapted to serve as an indicator, within the slot of said holder, said plurality of gates adapted to be moved from one of the months columns to another according to the date of deposits to provide for adjusting the indicator according to the amount.

3. A savings-account interest device of the type described, including a base member, a main member having hinged-connection with said base member a vertically movable slotted holder in extension of said base and main frames and including a plurality of transversely movable gates, one gate having an indicator arranged to operate within the slot of said holder, said plurality of gates being adapted to be moved from one of the months-columns to another according to the date of deposits and to provide for adjusting the indicator according to the amount.

4. In a devices as described having a frame adapted to receive a sheet therein, said sheet having vertical columns of figures thereon, a slide mounted in the frame for movement lengthwise of the columns, and having a slot arranged to extend across all said columns, and a plurality of independent gates slidably mounted on the slide over the slot for movement lengthwise thereof, the total length of the gates being less than that of the slot.

5. In a device as described having a frame adapted to receive a sheet therein, said sheet having vertical columns of figures thereon, a slide mounted in the frame for movment lengthwise of the columns, and having a slot arranged to extend across all said columns, and means mounted in connection with the slide for enabling only certain ones of any figures under the slot being exposed therethrough at one time.

6. In a device as described having a frame adapted to receive a sheet therein, said sheet having vertical columns of figures thereon, a slide mounted in the frame for movement lengthwise of the columns, and having a slot arranged to extend across all said columns, and means movable over the slot to uncover any certain portion thereof and to then cover the remainder of the slot.

7. An indicating device for use with a sheet having a pair of differentiated vertical columns of figures forming an indicator lead, and a plurality of vertical and transversely spaced columns, each having two rows of figures having a certain co-relation to the figures of the first named columns; consisting of a slide mounted across the sheet for movement lengthwise of the columns, said slide having an opening constantly exposing certain of the figures of the differentiated columns and a slot extending across all the other columns of a width to expose only one figure at a time in each row thereof; and a plurality of independent gates mounted on the slide for movement lengthwise of the slot, the total length of the gates relative to that of the slot being such that manipulation of the gates to space any two adjacent ones apart will uncover both rows of figures in any of the last named columns at a time.

8. In a device as described having a frame adapted to receive a sheet therein, such sheet having vertical and spaced columns of figures thereon, said columns having indicating headings, a slide mounted in the frame for movement lengthwise of the columns and having indicia, corresponding to the headings of the sheet columns, arranged in vertical alinement therewith, the slide having a slot extending across the columns; and a plurality of gates slidably mounted in the slide over the slot and arranged to be moved to uncover a portion thereof in vertical alinement with any one at a time of the indicia on the slide.

In witness whereof, I affix my signature.

HARRY S. MOIR.